(12) United States Patent
Birch et al.

(10) Patent No.: US 8,200,610 B1
(45) Date of Patent: *Jun. 12, 2012

(54) SYSTEM AND METHOD FOR SUPPORTING THE UTILIZATION OF MACHINE LEARNING

(75) Inventors: Robert D. Birch, Orlando, FL (US); Brian D. Craig, Oviedo, FL (US); Scott A. Irwin, Winter Springs, FL (US); Stephen D. Weagraff, Winter Park, FL (US)

(73) Assignee: Convergys CMG Utah, Inc., Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/236,079

(22) Filed: Sep. 19, 2011

Related U.S. Application Data

(63) Continuation of application No. 12/842,495, filed on Jul. 23, 2010, now Pat. No. 8,055,595, which is a continuation of application No. 11/751,680, filed on May 22, 2007, now Pat. No. 7,809,663.

(60) Provisional application No. 60/892,299, filed on Mar. 1, 2007, provisional application No. 60/747,896, filed on May 22, 2006.

(51) Int. Cl.
*G06F 15/00* (2006.01)
*G06F 15/18* (2006.01)

(52) U.S. Cl. ............... 706/62; 706/12; 706/16; 706/45; 707/687; 707/692; 707/694; 707/695

(58) Field of Classification Search .................. None
See application file for complete search history.

(56) References Cited

U.S. PATENT DOCUMENTS

| | | | | |
|---|---|---|---|---|
| 6,513,026 | B1* | 1/2003 | Horvitz et al. | 706/46 |
| 6,643,639 | B2* | 11/2003 | Biebesheimer et al. | 707/709 |
| 2002/0165842 | A1* | 11/2002 | Hellerstein et al. | 706/47 |
| 2006/0224535 | A1* | 10/2006 | Chickering et al. | 706/16 |
| 2006/0241954 | A1* | 10/2006 | Jeng et al. | 705/1 |
| 2006/0248031 | A1* | 11/2006 | Kates et al. | 706/25 |

* cited by examiner

*Primary Examiner* — Omar Fernandez Rivas
(74) *Attorney, Agent, or Firm* — Frost Brown Todd LLC

(57) ABSTRACT

A system and method is disclosed which integrates a machine learning solution into a large scale, distributed transaction processing system using a supporting architecture comprising a combination of computer hardware and software. Methods of using a system comprising such supporting architecture provide application designers access to the functionality included in a machine learning solution, but might also provide additional functionality not supported by the machine learning solution itself.

10 Claims, 7 Drawing Sheets

SYSTEM AND METHOD FOR SUPPORTING THE UTILIZATION OF MACHINE LEARNING

CROSS REFERENCE TO RELATED APPLICATIONS

This is a non-provisional patent application which is a continuation of U.S. non-provisional patent application Ser. No. 12/842,495, filed Jul. 23, 2010, which itself claims priority from U.S. non-provisional application Ser. No. 11/751, 680, filed on May 22, 2007, which itself claims priority from U.S. Provisional Patent Application 60/892,299, filed Mar. 1, 2007, "A System and Method for Supporting the Utilization of Machine Learning", and from U.S. Provisional Patent Application 60/747,896, filed May 22, 2006, "System and Method for Assisted Automation". Each of the applications identified above is incorporated by reference herein.

FIELD OF THE INVENTION

This invention is in the field of the incorporation of machine learning into large scale systems using logical separation of machine learning algorithms and models.

BACKGROUND

Automating customer care through self-service solutions (e.g., Interactive Voice Response (IVR), web-based self-care, etc. . . . ) results in substantial cost savings and operational efficiencies. However, due to several factors, such automated systems are unable to provide customers with a quality experience. The present invention addresses some of the deficiencies experienced with presently existing automated care systems.

Machine learning is a field where various algorithms have been developed that can automatically learn from experience. The foundation of these algorithms is built on mathematics and statistics which can be employed to predict events, classify entities, diagnose problems and model function approximations, just to name a few examples. While there are various products available for incorporating machine learning into computerized systems, those products currently suffer from a variety of limitations. For example, they generally lack distributed processing capabilities, and rely heavily on batch and non-transactional data processing. The teachings and techniques of this application can be used to address one or more of the limitations of the prior art to improve the scalability of machine learning solutions.

SUMMARY

As discussed herein, portions of this application could be implemented in a method of incorporating a machine learning solution, comprising a machine learning model and a machine learning algorithm, into a transaction processing system. Such a method might comprise the steps of: configuring an application interface component to access the functionality of the machine learning solution; configuring an algorithm management component to create, store, and provide access to instances of the machine learning algorithm according to requests received from the application interface component; and, configuring a model management component to create, store, version, synchronize, and provide access to instances of the machine learning model according to requests received from the application interface component. In some such implementations, the act of configuring the model management component comprises the steps of: implementing a synchronization policy for an implementation of the machine learning model according to a synchronization policy interface; implementing a persistence policy for the implementation of the machine learning model according to a persistence policy interface; and, implementing a versioning policy for the implementation of the machine learning model according to a versioning policy interface.

Further, some embodiments might include a mechanism for recording all activities of one or more of the agent, the caller, and/or the automated care system. In some embodiments, such recorded information might be used to improve the quality of self-care applications. Some embodiments might make use of transaction information and use it to learn, which might be accomplished with the help of machine learning software agents. This might allow the automated self-care system to improve its performance in the area of user interface, speech, language and classification models, application logic, and/or other areas relevant to customer and/or agent interactions. In some embodiments, agent, IVR and/or caller actions (e.g., what was spoken, what control buttons were pressed, what text input was proffered) might be logged with relevant contextual information for further analysis and as input to an adaptive learning phase, where this data might be used to improve self-care automation application.

Some embodiments of the invention of this application comprise a system and/or methods deployed comprising/using a computer memory containing one or more models utilized to process a customer interaction. In such embodiments, the system/method might further comprise/use one or more sets of computer executable instructions. For the sake of clarity, certain terms in the above paragraph should be understood to have particular meanings within the context of this application. For example, the term "computer executable instructions" should be understood to refer to data which can be used to specify physical or logical operations which can be performed by a computer. Similarly, a "computer" or a "computer system" should be understood to refer to any device or group of devices which is capable of performing one or more logical and/or physical operations on data to produce a result. "Data" should be understood to refer to information which is represented in a form which is capable of being processed, stored and/or transmitted. A "computer readable medium" should be understood to refer to any object, substance, or combination of objects or substances, capable of storing data or instructions in a form in which they can be retrieved and/or processed by a device. A "computer readable medium" should not be limited to any particular type or organization, and should be understood to include distributed and decentralized systems however they are physically or logically disposed, as well as storage objects of systems which are located in a defined and/or circumscribed physical and/or logical space. An "interface" should be understood to refer to a set of commands, formats, specifications and tools which are used by an entity presenting the interface to send and receive information.

For the purpose of clarity, certain terms used in the above description should be understood as having particular meanings within the technological context of this application. In that vein, the term "step" should be understood to refer to an action, measure, or process which might be taken to achieve a goal. It should further be understood that, unless an order is explicitly set forth as "necessary" through the use of that word, steps are not limited to being performed in the order in which they are presented, and can be performed in any order, or in parallel.

The verb "configure," when used in the context of "configuring an application interface component," or "configuring a model management component," should be understood to refer to the act of designing, adapting or modifying the thing being configured for a specific purpose. For example, "configuring an algorithm management component to create, store, and provide access to instances of a machine learning algorithm" might comprise modifying an application interface component to contain references to specific storage devices or locations on identified computer readable media on which instances of machine learning algorithm will be stored for a particular implementation.

A "transaction processing system" should be understood to refer to a system which is operable to perform unitary tasks or interactions. For example, a transaction processing system which receives requests for recommendations, and is expected to provide the requested recommendations, would be able to service the requests in real time, without requiring suspension of the requesting process to accommodate off line batch processing (e.g., overnight incorporation of learning events into a recommendation model).

Additionally, a "component" should be understood to refer to a constituent part of a larger entity (e.g., a system or an apparatus). One specific type of component which is often used in software is a module (i.e., a set of one or more instructions which, when executed by a computer, result in that computer performing a specified task). Continuing, the verb "incorporate," in the context of "incorporating" a machine learning solution into a system, should be understood to refer to the act of making the machine learning solution, or its functionality, a part of, or available to, the system into which the solution is "incorporated." Further, the verb "access" (and various forms thereof) in the context of this application should be understood to refer to the act of, locating, retrieving, utilizing, or making available, the thing being "accessed."

"Algorithms" comprise the logic necessary to update and/or create associated models. The term "functionality" should be understood to refer to the capabilities of a thing to be used for one or more purposes, or to fulfill one or more requirements.

The verb phrase "provide access to" (and the various forms thereof) should be understood to refer to the act of allowing some other entity to access that which the access is provided to. The verb "create" (and the various forms thereof) should be understood to refer to the act of bringing something into existence. The verb "store" (and the various forms thereof) should be understood to include any act of preserving or maintaining, however brief in duration that act might be. The verb "version" (and the various forms thereof) should be understood to refer to the act of assigning a unique identifier to an identifiable state of a set of data, such as a machine learning model. The verb "synchronize" (and the various forms thereof) should be understood to refer to bringing different instances of some construct, such as a machine learning model, into agreement with one another so that the same calculations performed using different (though synchronized) instances of the construct will yield the same result. The term "request" should be understood to refer to a message sent between components. The verb "receive" (and various forms thereof) should be understood to refer to the act of obtaining access to something. It should be understood that the word "receiving" does not imply obtaining exclusive access to something. Thus, a message could be "received" through the well known prior art methods of reading a notice posted on a bulletin board, or overhearing an announcement which was intended for someone else. Of course, that example is not intended to exclude situations where a device or entity gains exclusive access from the scope of the verb "receive." For example, if a letter is handed to its addressee, it could be said that the addressee has "received" the letter. The verb "implement" (and the various forms thereof) should be understood to refer to the act of making one or more steps necessary for the thing being "implemented" to be brought into existence, or realized. When a first thing is "implemented" "according to" a second thing, it should be understood to mean that the first thing is being put into practice in a manner consistent with, or controlled by, the second thing.

As a second example of how the teachings of this application might be implemented, some portions of this application might be implemented in a method comprising: receiving a learning event; sending the learning event to a model management component, where the model management component is configured to coordinate the learning event with a model; using a method exposed by a synchronization policy interface associated with the model, sending the learning event to a prototypical model; updating the prototypical model according to the learning event; and, propagating the updated prototypical model to a plurality of models. In such a method, the plurality of models to which the updated prototypical model is propagated might comprise the model and at least one model hosted remotely from the updated prototypical model. Further, in some such methods, the propagating step might take place during on-line processing.

For the purpose of clarity, certain terms as used above should be understood to have specific meanings in the context of this application. In that vein, the term "learning event" should be understood to refer to a situation or occurrence which takes place during the operation of a computer system which should be used to influence the operation of the computer system in the future.

The verb "send" (and various forms thereof) should be understood to refer to an entity or device making a thing available to one or more other entities or devices. It should be understood that the word sending does not imply that the entity or device "sending" a thing has a particular destination selected for that thing; thus, as an analogy, a message could be sent using the well known prior art method of writing the message on a piece of paper, placing the paper in a bottle, and throwing the bottle into the ocean. Of course, the above example is not intended to imply that the word "sending" is restricted to situations in which a destination is not known. Thus, sending a thing refers to making that thing available to one or more other devices or entities, regardless of whether those devices or entities are known or selected by sender. Thus, the "sending" of a "learning event" should be understood to refer to making the learning event available to the thing to which it is sent (e.g., by transmitting data representing the learning event over a network connection to the thing to which the learning event is sent).

In the context of coordinating a learning event with a model, the verb "coordinate" should be understood to refer to the act of establishing a relationship or association between the learning event and the model. Of course, it should be understood that the verb "coordinate" can also take the meaning of managing, directing, ordering, or causing one or more objects to function in a concerted manner. The specific meaning which should be ascribed to any instance of the verb "coordinate" (or a form thereof) should therefore be determined not only by the explicit definitions set forth herein, but also by context.

Additionally, "on-line processing" should be understood to refer to processing in which the product of the processing (e.g., a data output) is provided immediately or substantially immediately (e.g., within the scope of a single interaction such as a conversation or an on-line shopping session) after the inception of the processing. The term "hosted remotely" should be understood to refer to something which is stored on a machine which is physically separate from some other machine.

A "model" should be understood to refer to a pattern, plan, representation, or description designed to show the structure or workings of an object, system, or concept. Models can be understood as representations of data which can be created, used and updated in the context of machine learning. A "prototypical model" should be understood to refer to a model which is designated as a standard, or official, instance of a particular model implementation.

The verb "propagate" should be understood to refer to the act of being distributed throughout some domain (e.g., a prototypical model being propagated throughout the domain of like model implementations).

The term "method" should be understood to refer to a sequence of one or more instructions which is defined as a part of an object.

The verb "expose" (and the various forms thereof) in the context of a "method" "exposed" by an "interface" should be understood to refer to making a method available to one or more outside entities which are able to access the interface. When an interface is described as being "associated with" a model, it should be understood to mean that the interface has a definite relationship with the model.

Additionally, the verb "update" (and the various forms thereof) should be understood to refer to the act of modifying the thing being "updated" with newer, more accurate, more specialized, or otherwise different, information.

Finally, a statement that a first thing "takes place during" a second thing should be understood to indicate that the first thing happens contemporaneously with the second thing.

A "machine learning engine" should be understood as an abstraction for the functional capabilities of runtime execution of machine learning algorithms and models. A "machine learning context" is the runtime state of the model and the appropriate algorithm. A "machine learning controller" controls access to model and algorithms.

In an embodiment, there is a method of incorporating a computerized machine learning solution, comprising a machine learning model and a machine learning algorithm, into a transaction processing system, the method comprising configuring an application interface component to access a set of functionality associated with said machine learning solution; configuring an algorithm management component to access at least one instance of said machine learning algorithm according to a request received from the application interface component; configuring a model management component to access at least one instance of said machine learning model according to said request received from the application interface component, wherein configuring said model management component comprises the steps of: configuring a synchronization policy associated with said model management component; configuring a persistence policy associated with said model management component; and configuring a versioning policy associated with said model management component; and further configuring said machine learning solution to apply said at least one instance of said machine learning algorithm and said at least one instance of said machine learning model according to said request received from the application interface component.

In another embodiment, there is a computerized method of incorporating a machine learning solution, comprising a machine learning model, into a transaction processing system, the method comprising configuring an application interface component to access a set of functionality associated with the machine learning solution; configuring a model management component to access at least one instance of said machine learning model according to a request received from the application interface component, wherein configuring said model management component comprises the steps of: configuring a synchronization policy associated with said model management component; configuring a persistence policy associated with said model management component; and configuring a versioning policy associated with said model management component.

In another embodiment, there is method of incorporating said machine learning solution wherein said persistence policy comprises a set of computer-executable instructions encoding how, when, and where said machine learning model should be persisted.

In another embodiment, there is a method of incorporating said machine learning solution wherein said versioning policy is implemented according to a versioning policy interface which encodes how a machine learning model version in memory and a machine learning model version in persistent storage should be synchronized.

In another embodiment, there is a method of incorporating said machine learning solution further comprising accessing said synchronization policy through a synchronization policy interface.

In another embodiment, there is a method of incorporating said machine learning solution wherein said synchronization policy interface comprises computer-executable instructions for invoking said synchronization policy for said machine learning model.

In another embodiment, there is a computerized method comprising receiving a learning event; sending said learning event to a model management component, wherein said model management component is configured to determine a machine learning model associated with said learning event; using said machine learning model, accessing a synchronization policy associated with said model; sending said learning event to a prototypical machine learning model determined from said synchronization policy; updating said prototypical machine learning model according to said learning event to produce an updated prototypical machine learning model; and propagating said updated prototypical machine learning model to a plurality of machine learning models comprising said machine learning model and at least one other machine learning model hosted remotely from said updated prototypical machine learning model and said machine learning model. The propagating step may occur in real-time or near real-time.

In another embodiment, there is a computerized machine learning system comprising an application interface component further comprising a machine learning engine; a machine learning context; and a machine learning controller. It also includes a model management component further comprising a model pool; a model pool manager; and a synchronization manager. It also includes an algorithm management component comprising an algorithm manager; an algorithm instance map; an algorithm factory; an algorithm implementation; and an algorithm interface. The machine learning engine, in combination with the machine learning context provides said application interface component, accessible by an application program, and wherein said machine learning engine communicates a request to said algorithm management component and/or said model management component. The algorithm interface defines how an algorithm instance of an algorithm implementation is accessed.

The algorithm manager is configured to create, retrieve, update and/or delete an algorithm instance, through said algorithm factory, and enter said algorithm instance into said algorithm instance map based on said request received through said application interface component. A model is stored within said model pool and wherein a synchronization policy is associated with said model. The model pool manager is configured to create, retrieve, update and/or delete said model within the model pool based on said request received through said application interface component. The synchronization manager executes said synchronization policy associated with said model. The machine learning controller binds an algorithm instance with said model.

In another embodiment, the application interface component, provided by the machine learning context, is configured to expose a particular or proprietary machine learning algorithm. Not all algorithms may conform to the standard abstracted interface (learn, classify, regression); the "proprietary" provides access to algorithms interfaces that may not conform to the standard interface due to customizations or a new function.

In another embodiment, the application interface component, provided by the machine learning context, is configured to expose a general purpose interface.

In another embodiment, the application interface component, provided by the machine learning context, is configured to expose a focused interface to be applied to a specific task.

In another embodiment, the synchronization manager is configured to update a prototypical model only if said request contains an appropriate learning event.

In another embodiment, the appropriate learning event comprises that said model, associated with said request, is identical to the prototypical model except for a set of predetermined parameters which are updatable.

In another embodiment, the appropriate learning event comprises a situation wherein said model, associated with said request, and said prototypical model comprise an identical vendor, an identical algorithm structure, and a set of identical model parameter attribute types.

In another embodiment, the synchronization manager is configured to propagate an updated prototypical model to a plurality of models comprising said model and at least one model hosted remotely from said updated prototypical model.

In another embodiment, the propagation of said updated prototypical model to said plurality of models is executed in accordance with a synchronization policy associated with each of said plurality of models.

In another embodiment, the model pool manager is configured to retrieve a plurality of models within the model pool based on said request received through said application interface component.

In another embodiment, there is a method of utilizing a computerized machine learning solution, comprising a machine learning model, in a transaction processing system, the method comprising using a machine learning engine of an application interface component to connect said machine learning solution to an on-line retailer's website; coding a classification method, in said transaction processing system, to be invoked when a customer visits the website; coding said classification method to send a message to a machine learning controller; requesting a model manager and an algorithm manager from said machine learning controller for an instance of an associated algorithm and an instance of an associated model; determining a recommendation from a set of available products based on processing said instance of said associated algorithm, said instance of said associated model and an output from said classification method; coding a learn( ) method to be called when a purchase takes place; passing a purchase message, regarding said purchase, to said machine learning controller as a learning event; passing said learning event to an update method exposed by a synchronization policy interface of said instance of said associated model via said model manager; sending said learning event to a prototypical model; creating an updated version of said prototypical model; and propagating said updated prototypical model to a plurality of distributed servers according to a propagation method exposed by said synchronization policy interface. The propagation method may be a master-slave synchronization policy.

Additionally, it should be understood that this application is not limited to being implemented as described above. The inventors contemplate that the teachings of this application could be implemented in a variety of methods, data structures, interfaces, computer readable media, and other forms which might be appropriate to a given situation. Additionally, the discussion above is not intended to be an exhaustive recitation of all potential implementations of this disclosure.

DETAILED DESCRIPTION

Figure 1:
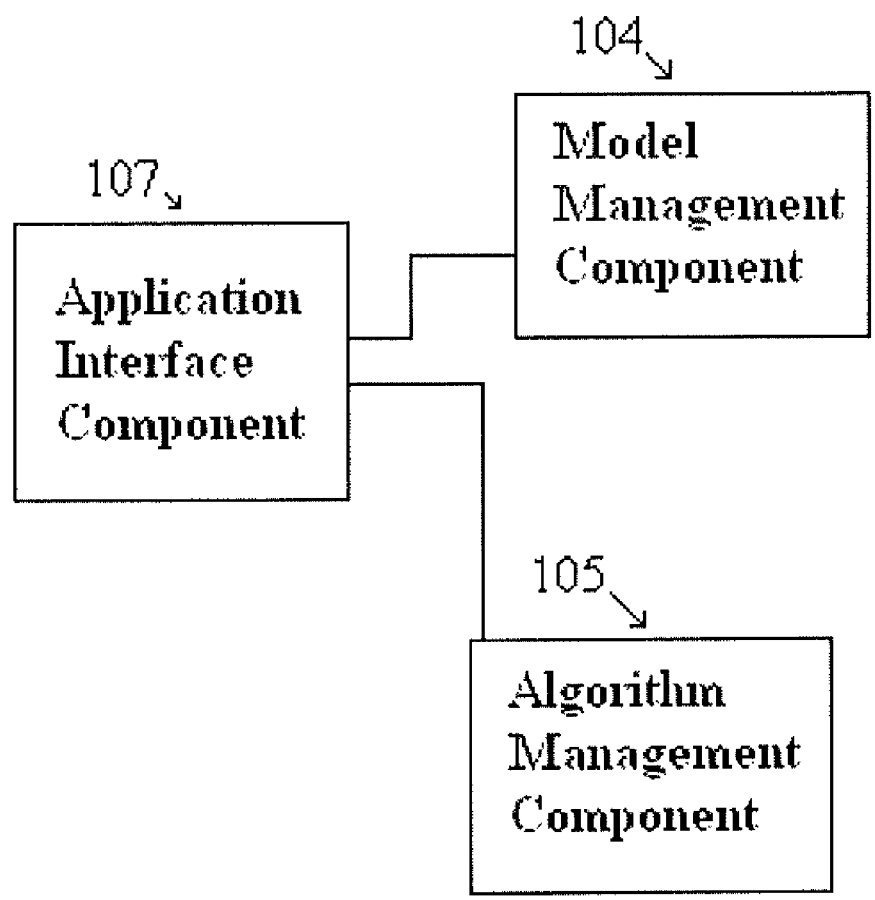
FIG. 1 depicts a high level diagram of components which could be used to integrate a machine learning solution into an application.

Other examples, features, aspects, embodiments, and advantages of the invention will become apparent to those skilled in the art from the following description, which includes by way of illustration, the best mode contemplated by the inventor(s) for carrying out the invention. As will be realized, the invention is capable of other different and obvious aspects, all without departing from the invention. Accordingly, the drawings and descriptions should be regarded as illustrative in nature and not restrictive. It should therefore be understood that the inventors contemplate a variety of embodiments that are not explicitly disclosed herein. For purposes of clarity, when a method/system/interface is set down in terms of acts, steps, or components configured to perform certain functions, it should be understood that the described embodiment is not necessarily intended to be limited to a particular order.

This application discusses certain computerized methods, computer systems and computer readable media which can be used to support computerized machine learning in contexts, such as large scale distributed transaction processing systems, which are not addressed by presently available market offerings. For the purpose of clarity, a machine learning solution should be understood to refer to sets of computer-executable instructions, computer-readable data and computerized components which can allow the automatic modification of the behavior of a computerized system based on experience. In this application, machine learning solutions are characterized as including models and algorithms. Models can be understood as representations of data which can be created, used and updated in the context of machine learning. Algorithms contain the logic necessary to update and/or create associated models. To clarify this concept, consider the example of a Bayesian network. A model for a Bayesian network would likely contain nodes, edges and conditional probability tables. Such a model could be stored in memory in a format such as a joint tree for efficiency purposes, and might be stored in files in a variety of formats, such as vendor specific binary or text formats, or standard formats such as Predictive Modeling Markup Language (PMML). A Bayesian network algorithm then could perform inferences using the Bayesian network model, adjust the model based on experience and/or learning events, or both. As a second example, a decision tree model would likely be represented in memory by a tree structure containing nodes representing decisions and/or conditionals. The decision tree model could be stored in files in vendor specific or general formats (or both), as set forth above for Bayesian network models. The logic, which would preferably be implemented in software, which updated the model and/or made classifications using the model and particular data would be the decision tree algorithm. The theoretical details underpinning Bayesian networks and decision trees in machine learning are well known to those of ordinary skill in the art and are not set forth herein.

As is discussed herein, the techniques and teachings of this application are broadly applicable to a variety of machine learning algorithms, models, and implementations. To clarify, an implementation should be understood as a particular way of realizing a concept. Differing model implementations might vary based on their vendor, the algorithm which creates and/or updates the model, the data format of the model (which format may be different between an instance of a model in memory and one which is persisted to secondary storage), and/or attributes which are included in the model. Such an implementation should not be confused with an instance, which should be understood as a particular object corresponding to a definition (e.g., a class definition specifying a model implementation).

To illustrate a distinction between these terms, there might be many instances of a particular implementation, (e.g., there might be many individual instances of a particular type of model implementation, or many instances of a particular algorithm implementation). Of course, it should also be understood that, while the techniques and teachings of this application are broadly applicable to a variety of implementations of both models and algorithms, the systems and methods which can be implemented according to this application will not necessarily be so generically applicable. Indeed, it is possible that the teachings of this application could be implemented in a manner which is specific to a particular model or algorithm or their respective implementations.

Turning to the drawings, FIG. 1 sets forth a high level architecture diagram comprising an application interface component [107], a model management component [104], and an algorithm management component [105]. These are components which can be embodied in a combination of hardware and software to incorporate machine learning into a computerized system. In the architecture of FIG. 1, the algorithm management component [105] allows algorithm instances to be created, stored, synchronized, persisted, and versioned such that they can be accessed by applications distributed across processes and, depending on the requirements of a particular implementation, may even be accessible by applications distributed across multiple hosts as well. As a complement to the algorithm management component [105], the high level architecture of FIG. 1 also includes a model management component [104] which can be implemented as a computer software module which manages a plurality of models, including persisting, versioning, and synchronizing the models. Other implementations might not include all such model management functionalities, or might include additional model management functionalities, as appropriate for the particular implementation. Further, it should be understood that, while the high level architecture of FIG. 1 depicts an algorithm management component [105] and a model management component [104] as distinct components, in some circumstances those components might be integrated rather than separated. Finally, the high level architecture of FIG. 1 includes an application interface component [107] which allows applications to access the functionality of one or more machine learning solutions incorporated into a particular implementation. Of course, it should be understood that this application is not limited to implementations following the high level architecture of FIG. 1, and that the teachings of this application could be incorporated in implementations which do not conform to the diagram of FIG. 1. Thus, the diagram of FIG. 1 should be understood as illustrative only and should be not treated as limiting on the scope of claims included in this application or in other applications claiming the benefit of this application.

Figure 1A:
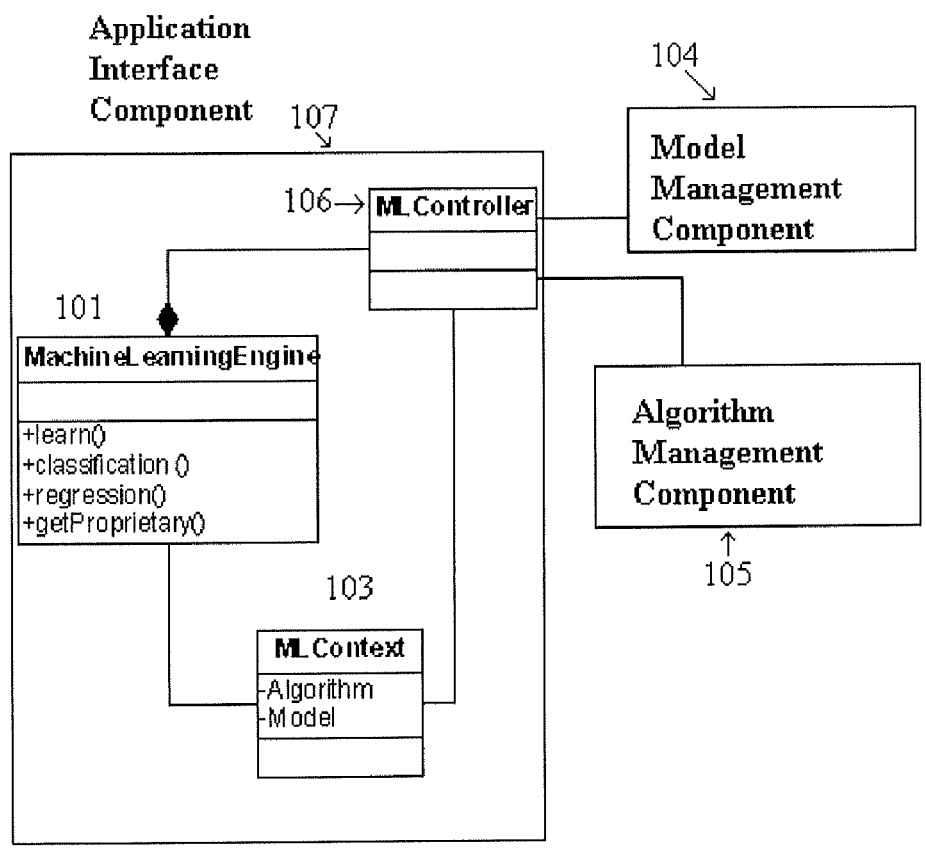
FIG. 1a sets forth additional detail regarding the application interface component shown in FIG. 1.
Figure 1B:
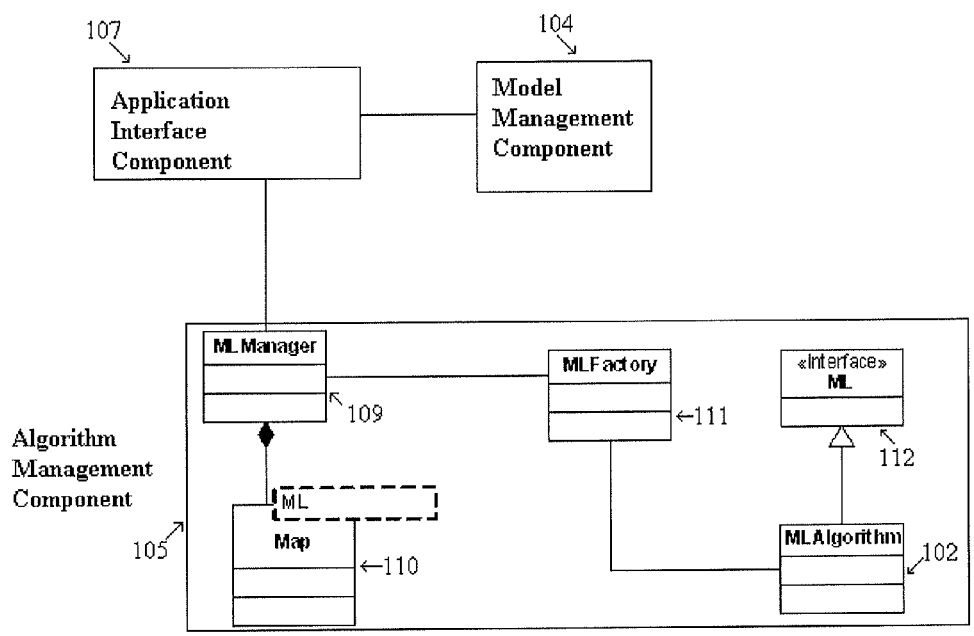
FIG. 1b sets forth additional detail regarding the algorithm management component shown in FIG. 1.
Figure 1C:
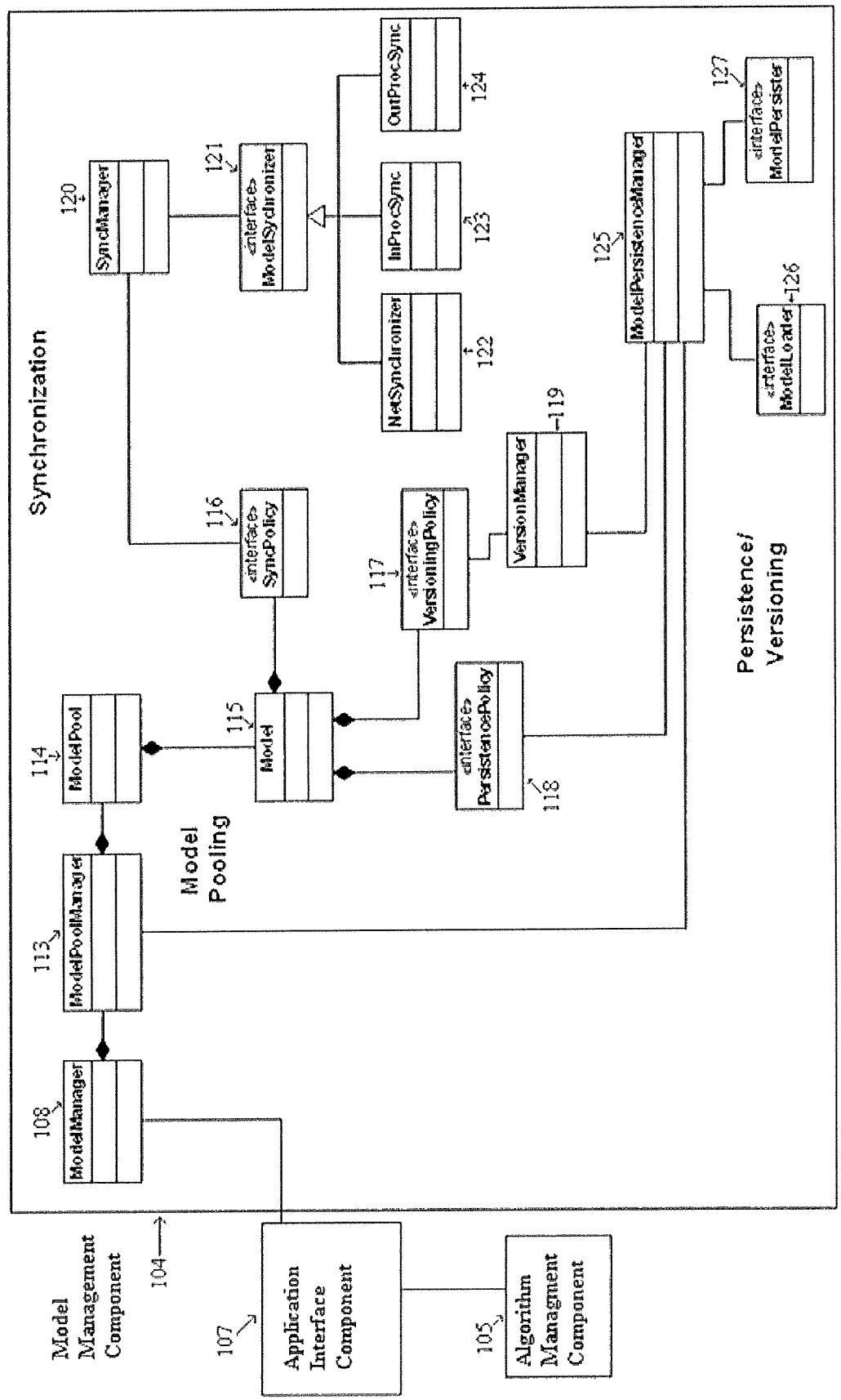
FIG. 1c sets forth additional detail regarding the model management component shown in FIG. 1.

Addressing the particular components of FIGS. 1-1c, FIG. 1a sets forth a diagram which provides additional information regarding subcomponents which make up the application interface component [107] of FIG. 1. Specifically, an application interface component [107] following FIG. 1a comprises subcomponents including a machine learning engine [101], machine learning context [103], and a machine learning controller [106]. In FIG. 1a, the machine learning engine [101] in combination with the machine learning context [103] provides an interface which can be used by application program developers to incorporate machine learning into their applications. Depending on the requirements of the implementation, the machine learning engine [101] might be extensible. Such an extensible machine learning engine [101] might provide a general purpose interface along with one or more focused interfaces which could be applied to a specific task or could make certain applications of machine learning easier for a developer. Additionally, the interface to the machine learning engine [101] could be designed with the ability to expose an interface of a particular machine learning algorithm, such as a decision tree algorithm or a Bayesian network algorithm. In an implementation following FIG. 1a, the machine learning context [103] might also be exposed to application developers. As shown in FIG. 1a, the machine learning context [103] can contain information, such as algorithms and models which could be used, either in whole or in part, as arguments to functions exposed by the machine learning engine [101]. Of course, alternative or additional information might be included in the machine learning context [103] (or the machine learning context [103] might be omitted, for example, through the addition of model and/or algorithm retrieval functions in the interface of the machine learning engine [101]) depending on the requirements of a particular implementation.

Returning specifically to FIG. 1a, the machine learning context [103] and machine learning engine [101] as depicted in that figure can be configured to interact with other system components (e.g., the model management component [104] and algorithm management component [105]) through a dedicated intermediary component, such as the machine learning controller [106]. In some implementations, either in addition to, or as an alternative to, acting as an intermediary, the machine learning controller [106] might have functionality such as binding algorithms and their associated models, maintaining context while algorithms and models are in use, and/or other functions appropriate to a specific implementation.

Algorithm Management

FIG. 1b sets forth a diagram which depicts, in additional detail, components which might be included in the algorithm management component [105] of FIG. 1. In an implementation following FIG. 1b, the algorithm management component [105] comprises an algorithm manager [109], an algorithm instance map [110], an algorithm factory [111], and an algorithm implementation [102]. Additionally the diagram of FIG. 1b depicts an algorithm interface [112]. In implementations including an algorithm interface [112] following FIG. 1b, the algorithm interface [112] represents a contract for how instances of the algorithm implementations [102] will be accessed. Consistent with this application, when an algorithm is being implemented, the individual or group responsible for the implementation could be required to adhere to the specifics of the algorithm interface [112]. Of course, it should be understood that claims which are included in this application or which are included in applications claiming the benefit of this application should not be limited to any particular algorithm interface [112], or even to the use of a defined interface at all, as algorithms could also be implemented in an ad-hoc manner without regard to a particular predefined interface. In some implementations which include an algorithm interface [112], the algorithm interface [112] might be designed such that it could retrieve proprietary implementations of particular algorithms. Alternatively, an algorithm interface [112] might be defined in such a way as to be able to act as a front end for numerous different algorithms and algorithm implementations [102]. Of course, combinations of the above techniques are also possible. For example, interfaces could be constructed which reduce the flexibility of algorithms accessed using those interfaces as a trade-off for simplification of the interface itself. Additional combinations, variations and alterations in algorithm interfaces [112] will be apparent to those of skill in the art.

Moving on from the algorithm interface [112], the algorithm management component [104] depicted in FIG. 1b also includes an algorithm manager [109] which can be implemented to have the functionality of creating algorithm instances on request and entering the requested instances into an algorithm map [110] that can be referenced when additional requests for a particular algorithm are made. In some implementations following FIG. 1b, when a request is made (for example, by the machine learning controller [106] within the application interface component [107]), the algorithm manager [109] is configured to check the algorithm map [110] for an algorithm instance that has already been created. If such an instance has been created, the algorithm manager [109] retrieves and returns that instance. Alternatively, the algorithm manager [109] might create a new instance of a requested algorithm through the use of the algorithm factory [111]. Such a new instance might then be returned and/or entered in the algorithm map [110] for later use. The algorithm map [110] could be implemented in a variety of manners, for example, as either a stateful or stateless component. In implementations wherein components are distributed across multiple hosts or processes, any state maintenance features for an algorithm map [110] could be supported by a routing mechanism which could ensure that requests for an algorithm are routed to the proper instance of that component. Alternatively, the algorithm map [110] could be implemented as a stateless component, in which case it could be stored in a persisted data store outside of the memory associated with any particular process utilizing the machine learning solution.

The teachings of this application could be implemented in a manner which is flexible enough to accommodate a plurality of alternative algorithms, such as decision trees, reinforcement learning, Bayesian networks, K-nearest neighbor, neural networks, support vector machines, and other machine learning algorithms. Returning to FIG. 1b, this flexibility can be seen by considering the algorithm implementation [102] component depicted in that figure. The algorithm implementation [102] represents the desirable attribute that developers are provided with the freedom to create their own implementation of an algorithm for use with a system implementing the architecture of FIG. 1b. Indeed, by utilizing the teachings of this application, a system could be implemented which is flexible enough that a plurality of algorithm implementations [102] (or even a plurality of underlying algorithms, as described previously) could be simultaneously utilized, with appropriate algorithm implementations [102] being retrieved through the use of the machine learning engine [101] in the application interface component [107]. As an additional point, in such an implementation, the algorithm management component [105] could be flexible in its configuration such that it might be distributed across multiple hosts (in which case, each host might have an instance from which processes on that host retrieve algorithms as necessary) or might be centralized on a particular host (in which case, processes on various other hosts might retrieve algorithms from the centralized host), or might be distributed in some intermediate manner (for example, there could be a number of devices hosting an instance of an algorithm management component which would be accessed by a group of associated machines). Of course, as stated previously, alternate implementations might utilize one or more of these basic techniques without including all features described previously. For example, some implementations might comprise certain features of the basic architecture depicted in the figures, but be customized for use with particular algorithms or algorithm implementations. This application should be understood as encompassing such modifications and variations, and should not be treated as limiting on any claims which claims the benefit of this application to only that combination of features and components depicted in the figures and discussed with reference thereto.

Model Management

FIG. 1c sets forth a diagram which depicts, in additional detail, components which might be included in the model management component [104] of FIG. 1. In an implementation following FIG. 1c, models are stored within a model pool [114] which can be implemented as a data structure which stores each instance of a model which has been created. Such a model pool [114] could be stored within a single process, across processes on a single host, or across a network on a distribution of hosts. In an implementation in which the model pool [114] is used to provide services across hosts there might be either a distributed model pool [114] local to each host, or there might be a centralized model pool [114] stored on a designated host. The model pool [114], like the algorithm map [110] described previously, could be implemented as either a stateless, or a stateful component, and, if implemented as a stateful component in a distributed system, could be supported by a routing mechanism which ensures proper delivery of requests for various models. Further, in implementations featuring multiple hosts, at least one host is potentially used to store a duplicate of the model pool [114] designated for backup and failover purposes. The creation and deletion of models within the model pool [114] could be handled by a model pool manager [113] which can be implemented in the form of a software module which retrieves models from the model pool [114] as they are requested. Potentially, the model pool manager [113] could be designed with awareness of load factors and will increase or decrease the model pool [114] depending on the request and update load for models in the pool [114]. The model pool manager [113] could retrieve, update, create and remove models in the model pool [114] based on requests received through a dedicated interface component such as the model manager [108] depicted in FIG. 1c. The model manager [108] can be implemented as a software module which has the functionality of coordinating the activities of the remaining components in the model management component [104].

Additionally, while it should be understood that the general architecture set forth in FIG. 1c could be utilized with only a single type of model associated with only a single machine learning algorithm, the architecture could be implemented in a flexible enough fashion that it can accommodate the simultaneous use of multiple model implementations, potentially associated with multiple machine learning algorithms and implementations. To avoid unnecessary complications, the subsequent discussion will generally treat the model [115] as a unitary component; but it should be understood that the model [115] might not be unitary, depending on the requirements of a particular implementation.

Figure 4:
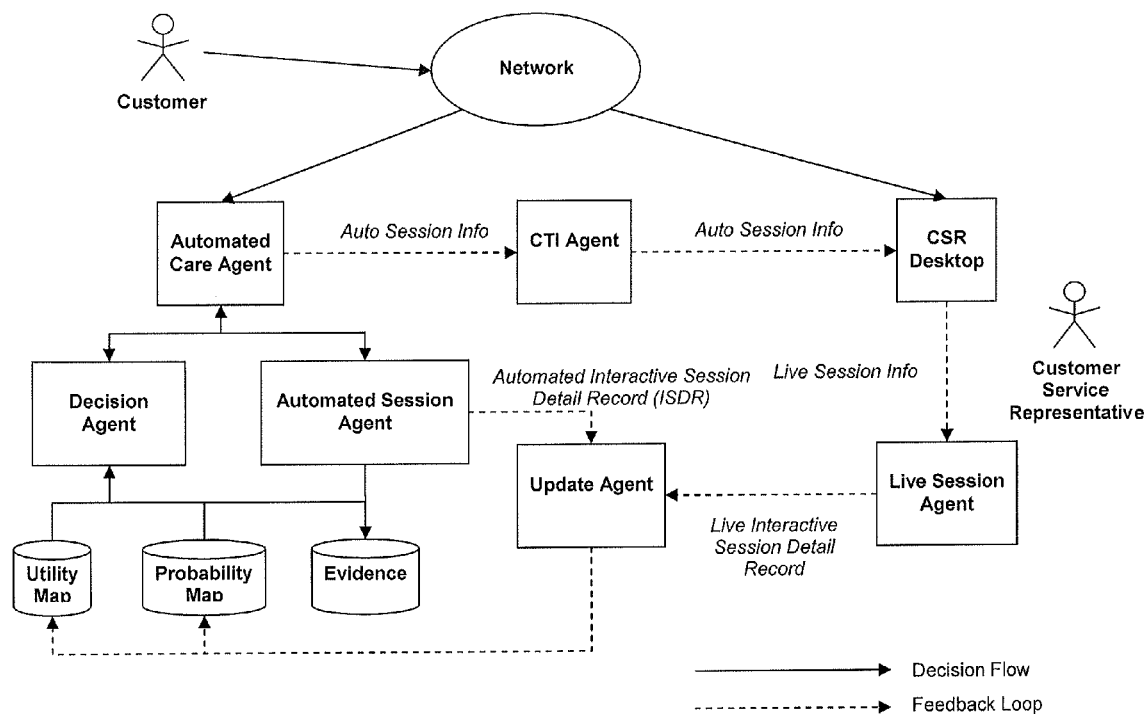
FIG. 4 sets forth an example of a framework which might be utilized in some embodiments of the invention.

As set forth previously, the architecture of FIG. 1c (and FIGS. 1, 1a, and 1b) could potentially be utilized to incorporate a machine learning solution into a large scale distributed transaction processing system (see, FIG. 4) without causing degradation in performance or becoming heavily dependent on batch or non-transactional processing. To that end, the architecture of FIG. 1c is potentially capable of being used for synchronization of models, that is, updating of disparate models within a distributed system using the model that has the most current information, for persisting of models, that is, reading from and writing to permanent storage as necessary for an implementation (e.g., when model updates need to be made permanent), and for versioning models, that is, for loading and storing models with appropriate identifications. A description of how the teachings of this application can be used to provide that functionality while supporting one or more machine learning solutions is set forth herein.

Synchronization of Models

Turning to the functionality of synchronization of models, the architecture of FIG. 1c is designed to account for the possibility that various models [115] might have individual synchronization policies. That is, the architecture of FIG. 1c could support different machine learning solutions having different methods of updating different models. Those methods can be accommodated by the use of a synchronization policy interface [116], which represents a contract or specification for how a synchronization policy for a particular model [115] can be invoked. The task of coordinating and executing the synchronization policies would then fall to a synchronization manager [120], which could be implemented as a software module or process which would call functions exposed by a model synchronizer interface [121] to trigger specific behaviors to synchronize a model used in the machine learning solution. As shown in FIG. 1c, software implementations of the model synchronizer interface [121] might include network synchronizers [122], in process synchronizers [123], and out of process synchronizers [124], which are software modules that provide behavior to, respectively, synchronize models across a network, synchronize models which reside in a single process, and synchronize models which span processes on a single host.

As a concrete example of a synchronization policy which could be implemented in a system implemented according to the architecture of FIGS. 1, 1a, 1b, and 1c, consider the case of a master-slave on-line format with periodic synchronization. In implementing such a policy, there could be a single model instance (or multiple model instances, as might be appropriate for failover, load balancing, or other purposes) which is designated as a master model which is deemed always correct. All learning events received by the system for the relevant machine learning solution would be sent to the master model, where they could either be incorporated into the model in real time, in batch, or using a combination of real time and batch processing as appropriate for a particular system. In some situations, system might also include computer memory which is designated as an asynchronous queue (or might include computer executable instructions having the capability to allocate memory for such a queue on an as-needed basis) which could be used to store learning events which had been received but not incorporated into the master model. The changes made to the master model could then be propagated to the remaining (slave) models via known methods, such as real time propagation, periodic propagation, triggered propagation (e.g., propagate every n learning events), or any other method or combinations of methods suitable for a particular implementation.

It should be understood that, while a master-slave periodic synchronization policy is described above, the architecture set forth in FIGS. 1-1c is not limited to a master-slave synchronization policy. For example, in some implementations, the resources available might be such that processing of learning events can be accommodated within the overall processing so as to allow each model instance to be updated with each learning event in real time. Alternatively, in some implementations (e.g., for systems in which an on-line system can be taken off-line to synchronize models), learning events might be processed in batch mode. In such a batch mode implementation, models might be interrogated during on-line processing for read-only events such as classification, diagnostics, or regression function calls, with learning events being stored in a computer memory in a format such as a persisted queue or an audit file. The stored learning events would be processed in batch mode and the models used by the on-line system would then be synchronized with the models created by the processing of the learning events. Similarly, hybrids of batch, real time, and other processing methodologies could be implemented, depending on the resources and needs of a particular system.

As an example of how the architecture of FIG. 1c could be utilized to address issues raised by model synchronization in various contexts, consider the case of synchronization latency. In some implementations (e.g., implementations where an on-line system can be shut down for updating purposes) all models can be synchronized concurrently. However, in some implementations, such concurrent synchronization might not be possible. A system implemented according to the architecture of FIGS. 1-1c could address that issue by including (e.g., in the synchronization manager [120]) an algorithm which staggers model updates. Any latency which is introduced by staggering the model updates could then be addressed as appropriate for that particular implementation, such as by blocking access to a model which has been selected for updating until after that model has been synchronized, or by blocking access to all instances of a particular model implementation when that implementation is being synchronized.

For the sake of clarity, it should be emphasized that, while the discussion above focuses on how a synchronization policy could be implemented in a system according to the architecture of FIGS. 1-1c, a single system might be implemented in such a way as to accommodate multiple synchronization policies. For example, a single system for supporting machine learning solutions might include multiple model implementations, and could be implemented in such a way as to segregate synchronization of models. Concretely, while a decision tree implementation which models classification of prescription drugs and a Bayesian Network implementation which is used as a model for network problem diagnosis and resolution could both be present in a single system, the models for those disparate implementations would be synchronized separately, as learning events and updates for one might not be relevant or appropriate for the other. One way to address this segregation of learning events is to implement a synchronization manager [120] in such a way that models are updated only if a learning event (or master model, or other update information, as is appropriate for an implementation) is associated with a model which is identical to the potentially updatable model except for the parameters which would be updated (that is, characteristics such as vendor, algorithm structure, and model parameter attribute types would be identical). The model instances associated with a particular implementation would then be synchronized separately, and that separate synchronization might take place using the same policy (e.g., all model instances for all implementations updated only in batch mode), or might take place with different policies for different implementations (e.g., one model implementation synchronized in batch, another model implementation synchronized in real time).

It should be understood that the segregation of model implementations described above is also intended to be illustrative on a particular approach to synchronization in the context of an implementation supporting multiple model implementations, and should not be treated as limiting on claims included in future applications which claim the benefit of this application. To demonstrate an alternate approach which could be used for synchronizing an implementation which supports multiple model implementations, consider the scenario in which different learning events are classified based on their relevance to particular model implementations. For example, when a purchase is made through the web site of the on-line retailer, that purchase might be used as a learning event which is relevant both to a model used for making product recommendations, and a model used for making targeted promotional offers. When such a learning event takes place, instead of sending it to a single master model which is then synchronized with models which are identical to the master model except for the potentially updatable parameters, the learning event's relevance classification would be obtained, and the learning event could be sent to all models to which it was relevant. Those models might be single model implementations used for different purposes, or they might be different model implementations entirely (e.g., different formats, parameters, and associated algorithms). Once the learning events had been associated with the relevant models, those models could use their own synchronization policies with the learning event, which might be master-slave policies, concurrent batch synchronization policies, combined synchronization policies, or other types of policies which are appropriate for the particular implementation as it is used within the constraints of the underlying system.

Similarly, while FIG. 1c depicts an architecture in which different components and interfaces (e.g., synchronization manager [120], network synchronizer [122], in process synchronizer [123], synchronization policy interface [116], model synchronizer interface [121], etc) interact for synchronization, it should be understood that some implementations might not follow the conceptually segregated approach set forth in FIG. 1c, and might instead combine the functionality of one or more components and interfaces depicted in that figure. For example, in systems in which model instances on multiple hosts must be synchronized, the instructions specifying how to handle a communication failure (e.g., attempt to update remote models and, if successful, update models locally so as to keep all models relatively synchronized with minimal latency) could be incorporated in the synchronization manager [120], the network synchronizer [122], or in a single combined component. Similarly, in implementations in which access to a model is blocked during on-line synchronization, instructions to implement the blocking of access to a model, and to restore the model once synchronization is complete could be incorporated into the synchronization manager [120], one or more of the network synchronizer [122], the in process synchronizer [123], or the out of process synchronizer [124], or in another component which combines the functions of one or more of the components just mentioned. The same is true for integrity preservation functions, such as backing out or rolling back of models, which could be used to insure continued integrity of the system even in cases of operator error or errors in update programming.

Persistence of Models

Moving on from the discussion of synchronization of models set forth above, a system implemented according to the architecture of FIGS. 1-1c could also incorporate functionality to support the persisting of models. As was the case with the synchronization of models, a system implemented according to the architecture of FIGS. 1-1c could include an interface (such as the persistence policy interface [118] of FIG. 1c which represents a contract or specification for how a persistence policy for a particular model [115] can be invoked) which is implemented in order to provide the behavior for a policy of persisting a model implementation. Such a policy could describe details such as how, when, and where the model should be persisted, the period of time between saves of models, a number of learning events which could take place to trigger a save of a model, fail over policies (e.g., where to store a model when it cannot be persisted to its normal location), and/or level of model sharing. The persistence policy might also include and implement configuration details, such as routines which might be utilized in a master-slave persistence format wherein one model is selected as prototypical for persistence, while other models are synchronized therefrom. In the architecture of FIG. 1c, the actual activities relating to the loading and persisting of models would be the responsibility of a model persistence manager [125], which could be implemented as a software component which, together with the versioning manager, ensures that the models are loaded, stored and identified according to the correct policies. The model persistence manager [125] could then interact with components implemented based on a model loader interface [126] and a model persister interface [127] which would be implemented to specify, respectively, how a model should be loaded and how it should be identified for loading, and how a model should be persisted to storage and how it could be identified for later retrieval.

As a specific example of functionality which could be included within a model persistence manager [125] consider the mechanics of actually retrieving a model. When retrieving a model, it is necessary to identify (or have stored information or defaults specifying) a model, for example, by name and location. One method of making that identification is to include a registry or name service within the model persistence manger [125] from which the appropriate identification information could be retrieved. As another example of functionality which could be incorporated into a model persistence manager [125], consider the task of model format conversion. In some implementations, for reasons such as increasing space or search efficiency of persistent storage, models in persistent storage might all be represented using a common format, which could be translated into a specific in-memory format for a particular model implementation when such a model is retrieved from storage into memory. The task of translating models from their individual formats for storage, and translating them to their individual formats for retrieval could be handled as part of the processing performed by the model persistence manager [125]. Of course, it should be understood that not all implementations will include such format translation, and that some implementations might store models in native format, or store some models in native format while translating others to a common format.

While FIG. 1c depicts an architecture in which different components and interfaces (e.g., Persistence Policy Interface [118], Model Persistence Manager [125], Model Loader Interface [126] and Model Persister Interface [127]) interact during the persisting of models, some implementations might not follow that conceptually segregated organization, and might instead combine the functionality of one or more of those components and interfaces. For example, in implementations which incorporate fail-over capacity (e.g., some level of RAID, or saving models to a separate disk), that fail-over capacity could be incorporated in the Model Persistence Manager [125], a component implemented according to the Model Persister Interface [127], or in a component which combined the functionality of that interface and component. Similarly, implementations of the architecture of FIG. 1c might combine functionality which was described as separate as well. For example, the Model Persistence Manager [125] might be configured to save a prototypical instance of a particular model implementation after some set or variable number of learning events are detected, while the remaining models might be saved on some other schedules (e.g., periodically, according to system requirements, or otherwise as is appropriate). Similarly, some implementations might include functionality to address the interaction between in-memory updates and the process of persisting models. For instance, if a process seeks to read a model from persistent storage, and has one or more updates in memory, then those updates could be applied before reading the model. Such an approach might be incorporated, for example, into the master-slave implementation discussed previously in relation to synchronization of models. It should be understood, of course, that the above examples are intended to illustrate that the Model Persistence Manager [125] could work in concert with the Synchronization Manager [120] to persist and synchronize the models, and that the functionality of the model persistence manager [125] and the synchronization manager [120] might be combined into a single component, as opposed to separated, as in FIG. 1c. Similarly, while some systems implemented according to this application might include a lower level of segregation than set forth in FIG. 1c, other implementations might include greater functional segregation. For example, some implementations might include an additional model persistence scheduler component (not shown in FIG. 1c) which could control timing of persisting of models. Thus, the architecture of FIG. 1c should be understood as illustrative only, and not limiting on the claims which claim the benefit of this application.

Versioning of Models

The architecture of FIG. 1c also includes a model versioning manager [119], which could be implemented as a computer software module to coordinate the versioning of models based on policies defined by an implementation of a model versioning policy interface [117] which represents a contract or specification for how a versioning policy for a particular model [115] can be invoked. The model versioning manager [119] might work in conjunction with the components discussed above (e.g., the model persistence manager [125]) to coordinate the saving and loading of models associated with different versioning identifications. The policy implemented according to the versioning policy interface [117] would then specify details such as how model versions in memory and model versions in persistent storage are synchronized, a version identification format, and a versioning implementation type. For example, in a master-slave type implementation, a prototypical version (the master) would always be the updated version of a model, and that version would then be persisted and synchronized across instances of the implementation. Of course, the architecture of FIG. 1c is not intended to be limited to master-slave type versioning implementations. Other types of versioning policies could be implemented according to a versioning policy interface [117] without departing from the scope of this application. For example, in some implementations, a version identification would be associated with a model's persisted state only, in which case updates made to a model in memory without being persisted might not be reflected and, if the model with the updates could not be persisted, then that version of the model would not take effect. As an additional alternative, versioning might be incorporated into any update applied to a model, whether in-memory or persistent. Additional alternatives (e.g., hybrids of the above two approaches, additional distributed approaches, or other approaches as appropriate for particular circumstances) could be implemented as well without departing from the scope of this application.

Figure 2:
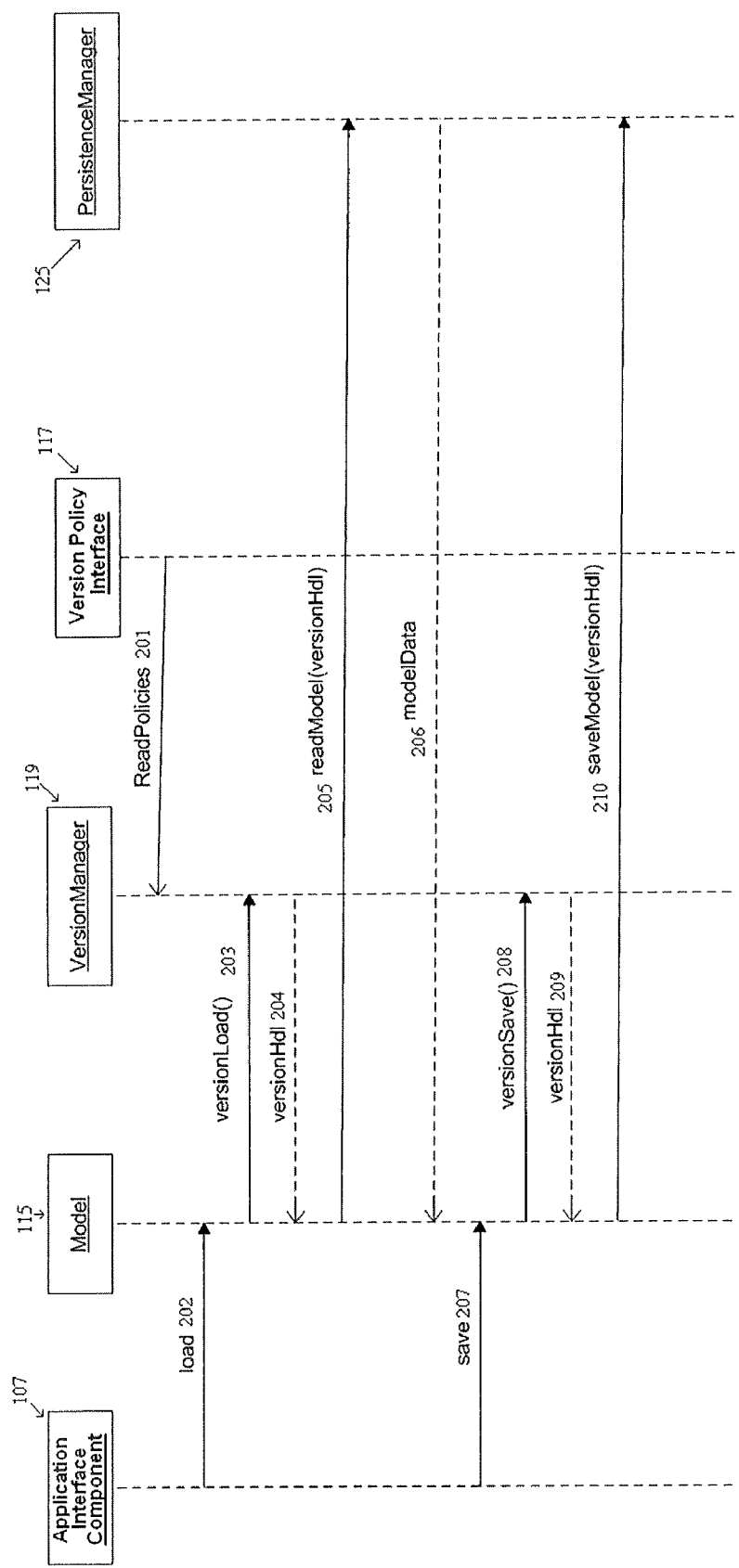
FIG. 2 sets forth a sequence diagram showing how a model might be loaded and saved.

As an example of how a model versioning manager [119] and a policy implemented according to a versioning policy interface [117] could interact with other components (e.g., a model [115], a persistence manager [125] and a domain actor utilizing the functionality of a machine learning solution via the application interface component [107]) of a system implemented according to the teachings of this application, consider the sequence diagram of FIG. 2. In that diagram, initially, the model versioning manager [119] loads [201] the policies to be used by the system through the versioning policy interface [117]. Subsequently, when an application needs to retrieve a model from storage, the application interface component [107] would be used to invoke the load command [202] for the particular model [115] which is required. The model [115] would then invoke a version loading function [203] which would request that the model versioning manager [119] access the appropriate policy to determine the correct version of the model to load. Once the model versioning manager [119] has determined the correct version of the model, it creates a handle that represents that model, and returns it [204] to the component which invoked the model versioning manager [119] (in this case the model [115]). That handle would then be passed as a parameter for a read function [205] to the model persistence manager [125] which would perform the appropriate load operation and return the model data [206] to the component which called the read function (in this case the model [115]). Similarly, when a save request [207] is received from an application through an application interface component [107], the model [115] would invoke a saving function [208] which would request that the model versioning manager [119] access the appropriate policy to determine the correct version for the information to be saved to. The model versioning manager [119] would return a handle [209] indicating the version of the model where the information should be saved. That handle would then be used as a parameter for a saving function [210] which would cause the persistence manager [125] to save the updates to the appropriate model version.

The actual mechanics of tracking a model's versions could vary between implementations of the versioning policy interface [117]. For example, in some implementations, there might be a database set up to keep track of the models, their locations, and their version identifications. Such a database could be implemented as a separate component (or collection of distributed components, as appropriate) which would be accessed by one or more of the components illustrated in FIG. 1c, or could be incorporated into, or interact with the model pool [114] described previously. As another option, in some implementations, a version identification could be incorporated into a file name for a model. As yet another option, a configuration management system could be integrated into the architecture of FIG. 1c so that each version of a model could be checked into the configuration management system using the appropriate application interfaces.

As set forth above, the architecture of FIGS. 1-1c is flexible enough to accommodate multiple machine learning solutions and model implementations from multiple vendors in a single system implemented according to the teachings of this application. However, in addition to those flexibility and scalability benefits, a system implemented according to this application could also provide functionality which might be absent from the machine learning models and algorithms provided by various vendors. For example, some model implementations might not support locking, or have features for thread safety. However, in such situations, the components discussed above with respect to FIGS. 1-1c could be implemented in such a way as to provide one or more aspects of the functionality omitted by the vendors. For instance, the components utilized in updating and persisting models (the model synchronization manager [120] and the model persistence manager [125] from FIG. 1c, though, as set forth above, a system implemented according to this application might not follow that particular framework) could be implemented in such a way as to track the use of models and provide support for multithreading, even if such support is not provided by a vendor. Similarly, if a vendor does not provide serialization as an atomic operation, the components of the architecture set forth in FIGS. 1-1c could be implemented such that serialization of a scalable machine learning solution supported by that architecture would be treated as an atomic operation. The same is also true for locking of particular models; since access to the individual models is provided through the components described previously, those components can be used to implement locking behavior, even if locking is not already present in a vendor supplied model.

In general, the present application sets forth infrastructure to support distributed machine learning in a transactional system. The infrastructure described herein provides a flexible framework which can accommodate disparate machine learning models, algorithms, and system configurations. The infrastructure would allow distribution of models and algorithms across hosts, and would allow requests for models and algorithms to be made by clients which are agnostic of the physical location of any particular algorithm or model. Specific customizations which might be necessary or desirable for individual implementations of models or algorithms could be made by tailoring particular policies accessed through generic interfaces in the infrastructure (e.g., synchronization policy interface [116]). Additionally, the architecture can be used to provide fail-over capabilities and load balancing for individual components used in a machine learning solution. Thus, a system implemented according to this application could be used to extend machine learning models and algorithms to large scale environments where they cannot currently be utilized.

Figure 3:
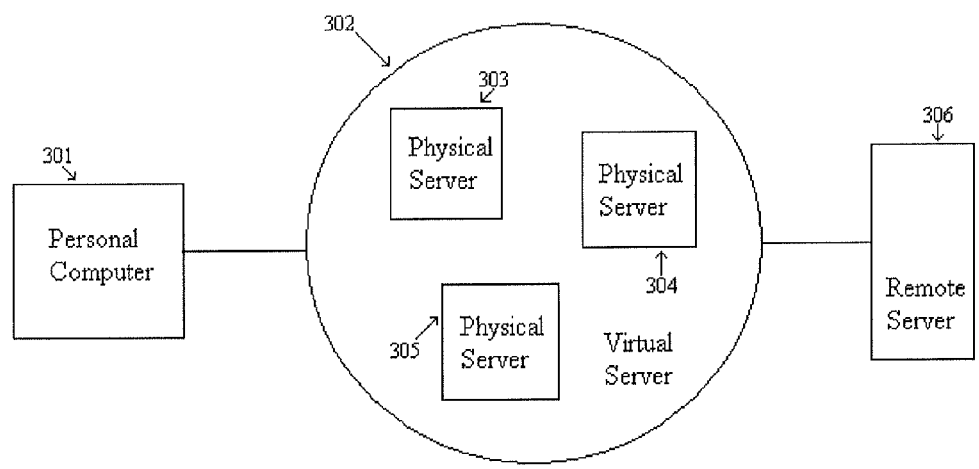
FIG. 3 sets forth a high level diagram of a system which might use some aspects of this application to support a machine learning solution.

As a concrete example of how the teachings of this application could be used to incorporate a machine learning solution into a real world transaction processing system, consider how an on-line retailer could incorporate a machine learning solution into a system as set forth in FIG. 3. As shown in FIG. 3, a web site maintained by the on-line retailer could be accessed by a personal computer [301] which is in communication with a virtual server [302] made up of a plurality of physical servers [303][304][305]. The virtual server [302] is also in communication with a central server [306] which stores copies of models which are used for making product recommendations when a customer accesses the on-line retailer's web site using the personal computer [301]. For the purpose of this example, assume that the actual process of making those recommendations takes place on the physical servers [303][304][305], using models and algorithms stored locally, rather than on the central server [306] (such an architecture could be the result of any number of motivations, including a desire to avoid a single point of failure, and a desire to avoid being limited by the processing capacity of the central server [306]). Finally, assume that, in addition to recommending products, the on-line retailer wishes to observe the products which customers actually buy, and use that information to make more accurate recommendations in the future.

Following the teachings of this application, to implement the desired recommendation and learning functionality, a developer working for the on-line retailer could use the machine learning engine [101] of the application interface component [107] to connect the desired functionality with the on-line retailer's web site. For example, using the methods as shown in FIG. 1a, the developer could write code which would cause the classification( )method of the machine learning engine [101] to be invoked when a customer visits the web site, and the output of that method to be used to determine the proper recommendation from among the available products. When the classification( ) method is invoked, a message would be passed to the machine learning controller [106] indicating the requirements of the machine learning engine [101]. The machine learning controller [106] would then make requests to the model manager [108] and algorithm manager [109] for an instance of the appropriate algorithm and model. When the request is made to the algorithm manager [109], that component would use the algorithm map [110] to determine if an instance of the correct algorithm had been created and, if it had, would return it. If the algorithm manager [109] checked the algorithm map [110] and found that an instance of the correct algorithm had not been created, it would request that an algorithm instance be created by the algorithm factory [111], then store that instance in the map [110] and return it to the machine learning controller [106]. When the request is made to the model manager [108], that component would use the model pool manager [113] to load an instance of the appropriate model [115] from the model pool [114], which instance would then be returned to the machine learning controller [106] so that it could be used by the machine learning engine [101].

Moving on from the retrieval of models and algorithms, consider now the events which might take place for a learning event to be received, processed, and propagated in a system such as that depicted in FIG. 3. Considering still the context of an on-line retailer, assume that a customer purchases an item, and that the on-line retailer wishes to use that purchase as a learning event so that the purchased item will be recommended to other customers in the future. For such a scenario, again, a developer might use a machine learning engine [101] to write code to connect the learning functionality to the on-line retailer's web site. For example, using the methods depicted in FIG. 1a, the developer might write code so that when a purchase (or other learning event) takes place, the learn( )method of the machine learning engine [101] is called. When this method is called, a message might be passed to the machine learning controller [106] indicating that a learning event has taken place and what the learning event is. That learning event would then be passed to a method exposed by the synchronization policy interface [116] of the appropriate model [115], via the model manager [108], the model pool manager [113], and the model pool [114]. As described previously, the synchronization policy interface [116] exposes methods which might be implemented differently according to different policies. For the purpose of this example, assume that the synchronization policy is a master-slave type synchronization policy in which a prototypical model stored on the remote server [306] is designated as being correct. In such a situation, the method called through the synchronization policy interface [116] would use the synchronization manager [120] to call a component such as the network synchronizer [122] though the model synchronizer interface [121] to send the learning event to the prototypical model stored on the remote server [306].

Continuing with the sequence of events above, assume that the synchronization policy is to asynchronously queue learning events at the remote server [306] and, every 100 events, process those events and propagate the changes to those events to the appropriate models residing on the physical servers [303][304][305]. Assume further, that the learning event discussed in the previous paragraph is the $100^{th}$ learning event added to the queue for the prototypical model. In such a scenario, when the network synchronizer [122] sends the learning event to the remote server [306], the remote server would process all of the queued learning events to create an updated version of the prototypical model. That updated version would then be provided to the network synchronizer [122] to update the model [115] stored locally on the physical server which presented the learning event. Additionally, the remote server [306] would propagate the updated prototypical model to the remaining physical servers, so that all of the physical servers [303][304][305] would have the most current copy of the model, including all modifications based on all learning events, regardless of which physical server [303] [304][305] actually detected those events.

It should be understood that the above example of how a machine learning solution could be integrated into a transaction processing system is intended to be illustrative only, and not limiting on the scope of claims included applications which claim the benefit of this application. The following are selected examples of variations on the above discussion of the situation of the on-line retailer which could be implemented by one of ordinary skill in the art without undue experimentation in light of this application.

As one exemplary variation, it should be noted that, while the above discussion of machine learning in the context of an on-line retailer was focused on making recommendations of products, the teachings of this application are not limited to making recommendations, and could be used to incorporate machine learning solutions into systems which perform a broad array of tasks, including making decisions about call routing in a network, determining a response for a computer in a interactive voice response system, and determining a likely source of a problem a customer is experiencing with a network service. Additionally, it should be noted that, while the discussion of machine learning in the context of an on-line retailer focused on a single model, it is possible that the teachings of this application could be used to support many models simultaneously in a single deployment. For example, in the case of the on-line retailer, there might be, in addition to the models used for recommendations, different models and algorithms used to perform functions such as fraud detection, determination of eligibility for special promotions, or any other function which could appropriately be incorporated into the operations of the retailer. All such functions, perhaps using different models, algorithms, synchronization policies, etc. could be supported by a single implementation of this disclosure deployed on the system as described in FIG. 3.

In a similar vein, while the discussion of machine learning in the context of an on-line retailer was written in a manner which is agnostic regarding particular algorithms and models (i.e., the system was designed to work equally well with a variety of models and algorithms such as Bayesian network, decision tree, or neural network algorithms and models), it is also possible that the supporting infrastructure for a machine learning solution could be implemented in a manner which is customized for a particular machine learning solution from a particular vendor. Further, while the example of learning in the context of an on-line retailer included a synchronization policy which processed learning events every time 100 learning events were queued, different policies might be appropriate for different implementations. For example, based on the teachings of this application, a system could be implemented in which a multiprocessor Red Hat Unix system operating on a high speed network infrastructure is used for making recommendations and processing learning events. As an implementation of the teachings of this application on such a system is estimated to be capable of performing at least 2000 classifications/second (7250 classifications/second at peak time) and processing at least 660 learning events/second (2400 learning events/second max estimation), a policy might be designed requiring that updated models would be propagated at least every 660 learning events, so that the models used by the system would not be more than 1 second out of date at any given time.

Some of the principles regarding the synchronization/versioning/persistence of models may also be applied/integrated into the algorithm management component. In an embodiment, if the algorithm that needs to be synchronized doesn't affect the structure of the model then it the algorithm could be synchronized within the running system. If the algorithm changes the structure then every model that is affected by the algorithm change would have to be converted to the new structure and, possibly, retrained and then synchronized into the system. Methods would need to be employed to ensure that algorithms aren't inadvertently synchronized that make changes to the model structure.

The list of variations set forth above is not meant to be exhaustive or limiting on the scope of potential implementations which could fall within the scope of claims included in applications which claim the benefit of this application.

Instead, all such claims should be read as limited only by the words included in their claims, and to insubstantially different variations therefrom.

We claim:

1. A non-transitory computer readable medium having stored thereon a set of instructions operable to configure a computer system to perform a set of acts comprising:
   a) receiving a learning event;
   b) sending said learning event to a model management component, wherein said model management component is configured to determine a machine learning model associated with said learning event;
   c) using said machine learning model, accessing a synchronization policy associated with said model;
   d) sending said learning event to a prototypical machine learning model determined from said synchronization policy;
   e) updating said prototypical machine learning model according to said learning event to produce an updated prototypical machine learning model; and
   f) propagating said updated prototypical machine learning model to a plurality of machine learning models comprising said machine learning model and at least one other machine learning model hosted remotely from said updated prototypical machine learning model and said machine learning model.

2. The non-transitory computer readable medium, as claimed in claim 1, wherein said set of instructions is operable to configure the computer system to perform the propagating step in real time.

3. A computerized method comprising:
   a) receiving a request from an application program through an application interface;
   b) communicating the request received from the application program to a model management component, wherein the model management component comprises:
      i) a model pool;
      ii) a model pool manager; and
      iii) a synchronization manager;
   wherein a model is stored within said model pool and wherein a synchronization policy is associated with said model;
   wherein said model pool manager is configured to create, retrieve, update and/or delete said model within the model pool based on said request received through said application interface component;
   wherein said synchronization manager executes said synchronization policy associated with said model;
   wherein said synchronization manager is configured to update a prototypical model only if said request contains an appropriate learning event;
   wherein said appropriate learning event comprises that said model, associated with said request, and said prototypical model comprise an identical vendor, an identical algorithm structure, and a set of identical model parameter attribute types.

4. A non-transitory computer readable medium having stored thereon a set of instructions operable to configure a transaction processing system to perform a set of steps comprising:
   a) sending a message to a machine learning controller in response to a predefined event;
   b) based on the message, requesting a model manager and an algorithm manager from said machine learning controller for an instance of an associated algorithm and an instance of an associated model; and
   c) responding to the predefined event based on processing of the instance of the associated algorithm, the instance of the associated model, and an output from a classification method.

5. The non-transitory computer readable medium of claim 4, wherein the set of steps further comprises:
   a) calling a learn method when a second predefined event takes place;
   b) passing a second predefined event message, regarding said second predefined event, to said machine learning controller as a learning event;
   c) passing said learning event to an update method exposed by a synchronization policy interface of said instance of said associated model via said model manager;
   d) sending said learning event to a prototypical model; and
   e) creating an updated version of said prototypical model.

6. The non-transitory computer readable medium of claim 5, wherein the set of steps further comprises propagating said updated prototypical model to a plurality of distributed servers according to a propagation method exposed by said synchronization policy interface.

7. The non-transitory computer readable medium of claim 4, wherein:
   a) the predefined event comprises a customer visiting a web site; and
   b) responding to the predefined event comprises determining a recommendation from a set of available products.

8. The non-transitory computer readable medium of claim 7, wherein the second predefined event comprises a purchase taking place.

9. The non-transitory computer readable medium of claim 4, wherein:
   a) the predefined event comprises receiving a natural language input from a user; and
   b) responding to the predefined event comprises performing at least one action taken from the set of actions consisting of:
      i) classifying the natural language input; and
      ii) determining a response by a computer in an automated dialog.

10. The non-transitory computer readable medium of claim 4, wherein
   a) the predefined even comprises receiving a call from a user; and
   b) responding to the predefined event comprises making a routing determination for the call.

* * * * *